(12) United States Patent
Mehta et al.

(10) Patent No.: US 9,998,499 B2
(45) Date of Patent: Jun. 12, 2018

(54) MANAGEMENT OF APPLICATION ACCESS TO DIRECTORIES BY A HOSTED DIRECTORY SERVICE

(71) Applicant: Amazon Technologies, Inc., Seattle, WA (US)

(72) Inventors: Gaurang Pankaj Mehta, Seattle, WA (US); Shon Kiran Shah, Redmond, WA (US); Krithi Rai, Redmond, WA (US); Guruprakash Bangalore Rao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 643 days.

(21) Appl. No.: 14/499,714

(22) Filed: Sep. 29, 2014

(65) Prior Publication Data
US 2016/0094584 A1 Mar. 31, 2016

(51) Int. Cl.
| G06F 7/04 | (2006.01) |
| G06F 17/30 | (2006.01) |
| H04N 7/16 | (2011.01) |
| H04L 29/06 | (2006.01) |
| G06F 21/44 | (2013.01) |
| G06F 21/60 | (2013.01) |

(Continued)

(52) U.S. Cl.
CPC .......... *H04L 63/205* (2013.01); *G06F 21/44* (2013.01); *G06F 21/604* (2013.01);
(Continued)

(58) Field of Classification Search
CPC ..... H04L 61/1505; H04L 63/10; H04L 63/20; H04L 63/205; G06F 21/62;
(Continued)

(56) References Cited

U.S. PATENT DOCUMENTS 5,968,121 A * 10/1999 Logan ............... H04L 29/12009
707/E17.01
6,233,616 B1 5/2001 Reid
(Continued)

FOREIGN PATENT DOCUMENTS

| JP | 2009508208 A | 2/2009 |
| WO | 2007030796 A2 | 3/2007 |

OTHER PUBLICATIONS

International Search Report and Written Opinion in PCT Application No. PCT/US15/51937 dated Feb. 1, 2016, 17 pages.

*Primary Examiner* — Jayesh M Jhaveri
(74) *Attorney, Agent, or Firm* — Knobbe Martens Olson & Bear, LLP (57) ABSTRACT

Features are disclosed for facilitating management of network directories of multiple organizations by a centralized directory management system. Various applications can access the directories of the organizations via the directory management system according to the permissions that the applications have been granted by the respective organizations. Organizations may maintain directories on-premises or off-premises, and the applications can access the directories via the directory management system regardless of the physical location of the directories. Additionally, the applications may be hosted by a computing service provider that also hosts or otherwise manages the directory management service, or the applications can be hosted by third-party servers separate from the directory management system and the organizations.

17 Claims, 5 Drawing Sheets

(51) Int. Cl.
   *G06F 21/62*   (2013.01)
   *H04L 29/12*   (2006.01)
(52) U.S. Cl.
   CPC .......... *G06F 21/6218* (2013.01); *H04L 63/10*
   (2013.01); *G06F 21/62* (2013.01); *G06F*
   *21/6209* (2013.01); *H04L 61/1505* (2013.01);
   *H04L 63/20* (2013.01)
(58) Field of Classification Search
   CPC .... G06F 21/6209; G06F 21/6218; G06F 7/04;
   G06F 17/30; H04N 7/16
   See application file for complete search history.

(56) References Cited

U.S. PATENT DOCUMENTS

| | | |
|---|---|---|
| 8,055,691 B2 | 11/2011 | Delgaudio et al. |
| 8,285,817 B1 | 10/2012 | Balasubramanian et al. |
| 2002/0138572 A1* | 9/2002 | Delany ................... G06F 21/41 |
| | | 709/204 |
| 2004/0073668 A1* | 4/2004 | Bhat ................... H04L 63/0227 |
| | | 709/225 |
| 2005/0102297 A1* | 5/2005 | Lloyd ............... G06F 17/30067 |
| 2007/0174905 A1 | 7/2007 | Martherus et al. |
| 2010/0182984 A1* | 7/2010 | Herscovici .......... H04L 63/0892 |
| | | 370/338 |
| 2010/0262632 A1 | 10/2010 | Jain et al. |
| 2011/0314520 A1* | 12/2011 | Olszewski .............. G06F 9/468 |
| | | 726/4 |
| 2013/0219456 A1* | 8/2013 | Sharma .............. H04L 63/0815 |
| | | 726/1 |
| 2014/0343989 A1* | 11/2014 | Martini ................. H04L 63/104 |
| | | 705/7.17 |
| 2015/0134827 A1* | 5/2015 | Shah .................. H04L 61/1547 |
| | | 709/226 |
| 2015/0220559 A1 | 8/2015 | Sudheer et al. |

* cited by examiner

MANAGEMENT OF APPLICATION ACCESS TO DIRECTORIES BY A HOSTED DIRECTORY SERVICE

BACKGROUND

Organizations, such as companies and other enterprises, often network their computing devices to communicate with each other and with computing devices outside of the organization. Network directories, also referred to simply as "directories," are specialized collections of information about devices, applications, people and other common objects of computer networks. Organizations with computing networks typically use directories to efficiently locate, organize, administer and otherwise manage the network resources. For example, a user may be added to a directory and associated with particular credentials. Thereafter, the user may be authenticated by comparing user-supplied credentials (e.g., obtained during a login procedure) to those in the directory. Information about what the user is authorized to do may then be retrieved from the directory. As another example, individual computers, printers and other devices that are part of a network environment may be listed in a directory, and applications or users may look up a list of available devices in the directory and obtain information for accessing them (e.g., names, addresses, etc.).

Some network-based service providers (e.g., providers of "cloud-based" services to external customers, such as file storage and backup, messaging, social networking, and the like) maintain their own directories and use those directories in part to provide authentication services to third party applications and services. Customers and other users create accounts with the network-based service providers and obtain user credentials. Users can then log onto various third party applications and services using the credentials associated with the network-based service provider, and the network-based service provider can authenticate the user without exposing the user's secure information (e.g., password) to the third party applications and services.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure involves an architecture in which a directory service that is separate from enterprises and other organizational customers (e.g., a cloud-based or other remote directory service) can facilitate the use of the customers' own directories to access, interact with, and otherwise use applications that are also separate from the customers. The directory service can manage access to the directories of multiple (e.g., two or more) customers by applications that may be associated with the directory service, or by third-party applications separate from both the directory service and the customers.

Some conventional directory service providers offer authentication services to third-party applications, and the applications may be authorized to access certain directory information. For example, a social network may maintain a directory of users in which user login credentials, contact information, and other information associated with the users is stored. The social network may provide login and authentication services to third-party applications, thereby allowing users to log in to multiple applications using a single set of login credentials without worrying about unauthorized exposure of their passwords and other information to the other applications. In addition, the social network (with authorization from users) may allow the third-party applications to access certain directory information, such as information about the users' contacts, access to user-specific portions of the social network, etc. However, such conventional directory services do not integrate with multiple, separate customer directories; rather, they typically maintain their own directories. Thus, users wishing to use such conventional directory services must create new accounts and obtain new login credentials rather than leveraging their own existing accounts, login credentials, and other directory information (e.g., directory information from a directory managed by the enterprises for which the users work).

Some aspects of the present disclosure relate to systems that manage access to the directories of multiple (e.g., two or more) different customers by applications remote from the customers. Individual customers (e.g., enterprises and other organizations) may configure access to their own directories through a network-based directory service that services multiple customers. In some embodiments, the network-based directory service may provide an interface with which customers may configure application access to the customers' directories. For example, a customer may access a web-based interface, hosted by or generated by the network-based directory service. The customer may select individual applications that are configured to use or are otherwise compatible with the network-based directory service. The customer can then selectively authorize one or more of the applications to access the customer's directory and authorize the applications to perform other directory-related actions. Illustratively, the directory-related actions that customers may authorize applications to perform may include, among other things: creating, modifying, and/or deleting users; creating, modifying, and/or deleting groups of users; managing passwords; listing users; authenticating users; joining computers to domains; creating, modifying, reading, writing, and deleting files; modifying file storage structures; and the like. In some embodiments, a customer may have multiple directories, and can authorize application access and/or assign permissions on a directory-by-directory basis. In additional embodiments, a customer may have multiple groups of users or other objects within a given directory, and the customer can authorize access and/or assign permissions on a group-by-group basis.

Additional aspects of the present disclosure relate to managing the access that applications have to directories of particular customers, whether those directories are on-premises directories or off-premises directories. Individual customers may have directories on their own premises (e.g., stored on servers physically present on, or proximate to, their premises) or off-premises (e.g., stored on servers physically remote from the customer premises, such as a data center of a network-based directory service or other computing service provider). In order to support both types of customers, the network-based directory service may implement application programming interfaces ("APIs") and/or other system components that allow applications to access, modify, and otherwise use customer directories regardless of whether they are on-premises or off-premises (with respect to the customer). Thus, a single network-based directory service may facilitate access by any number of applications to the directories of any number of customers, regardless of the physical location of the directories. Such a network-based directory service is more flexible than a traditional network-based directory service that maintains its own directory for access by applications, or directory services which provide access to the directory of only a single customer. In some embodiments, the access permissions that organizations are permitted to provide to applications with respect to on-premises directories may be identical to the access provided to applications with respect to off-premises directories, while in other embodiments the access permissions that organizations are permitted to provide with respect to on-premises directories may be different than off-premises directories.

Although aspects of the embodiments described in the disclosure will focus, for the purpose of illustration, on specific examples and embodiments of applications, directories, directory services, and network-based computing service providers, one skilled in the art will appreciate that the examples and techniques disclosed herein are illustrative only and may be applied to any number of services, process, or applications. Various aspects of the disclosure will now be described with regard to certain examples and embodiments, which are intended to illustrate but not limit the disclosure.

Example Network Environment

Figure 1:
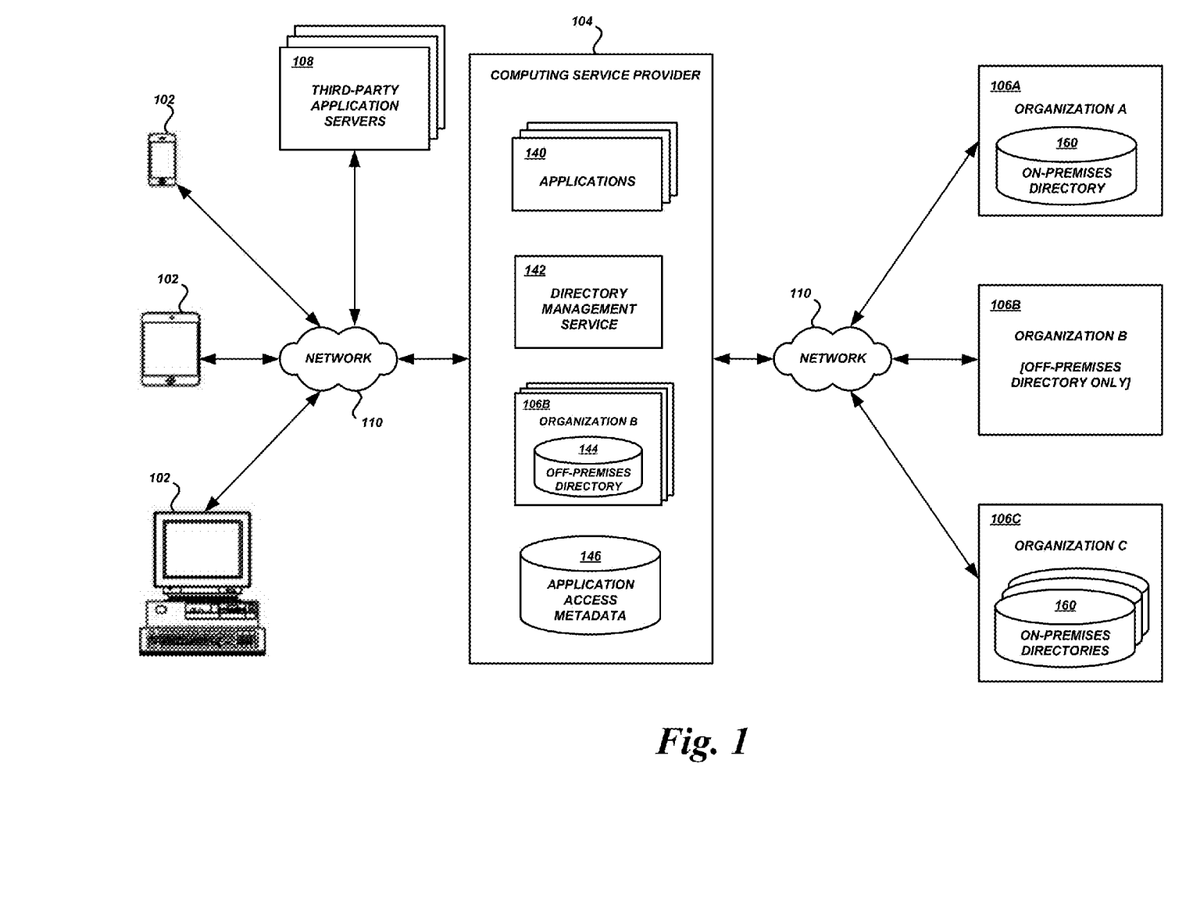
FIG. 1 is a block diagram of an illustrative network environment including a computing service provider and various organizations, applications, and users according to some embodiments.

FIG. 1 shows an example network environment in which directory management features of the present disclosure can be implemented according to some embodiments. As used herein the term "directory" generally refers to an organized collection of data about users, devices, applications, and other common resources of a computer network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information. As used herein, the term "permissions" general refers to security clearance, access rights, policies, and other forms of authorization that may be granted to users, devices, applications, and services. Such permissions often indicate, among other things: which computing resources (represented by objects in a directory) can be accessed, modified, created, deleted, or used; which network-related or directory-related actions may be performed; and the like.

As shown, the network environment includes various user devices 102, a computing service provider 104, organizations 106 and third-party application servers 108 in communication via one or more networks 110. The computing service provider 104 can provide applications, directory management services, and/or other network-based services to various organizations or other customers. Organizations 106A-106C (or other customers) can employ the computing service provider 104 to provide application access to users associated with the organizations, manage the organizations' directories, etc. Individual users can use computing devices 102 to access applications hosted by the computing service provider 104 (or third-party application servers 108) using credentials from their respective organizations 106A-106C. In addition, the computing service provider 104 can provide the applications with access to the directories of the various organizations 106A-106C at the discretion of the respective organizations, as described in greater detail below.

The user computing devices 102 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors, computer-readable memory and network-access capabilities. Some user computing devices 102 may be associated with a particular organization 106A-106C. For example, an organization may have various user computing devices 102 that remain on-premises, or that are used off-premises primarily by employees or other users associated with the organization. In some embodiments, some or all of the user computing devices 102 may be separate from any organization, such as public computers or home computers that are used by any number of users to perform various tasks, which may include accessing applications using credentials associated with a particular organization 106A-106C or other customer of the computing service provider 104.

The computing service provider 104 can be a computing system configured to host or otherwise provide access to applications 140, manage directories for separate customer organizations 106A-106C, and/or provide other network-based services and resources. For example, the computing service provider 104 can be a server or group of servers that may be accessed via a communication network 110. The computing service provider 104 can include a number of components to provide various features described herein, such as one or more applications or application servers 140 and a directory management system or service 142 that can be accessed by organizations 106 and user computing devices 102. The computing service provider 104 may also store various off-premises directories 144, such as an off-premises directory for organization 160B, as described below. The computing service provider 104 may also include various data stores, such as an application access data store 146 to store metadata regarding the directories that can be accessed by applications 140 within the computing service provider 104 and/or applications on third-party application servers 108. In some embodiments, the computing service provider 104 may include additional or fewer components than illustrated in FIG. 1.

As used herein, the term "off-premises directory" refers to a directory that is remote from the organization with which it is associated, in order to distinguish such a directory from a directory that is located on an organization's premises.

Thus, although a directory may be physically stored on the premises of a computing service provider 104, the directory may nevertheless be referred to as an off-premises directory because it is off-premises with respect to the organization with to which it belongs (e.g., the organization that owns or operates the network described by the directory). Additionally, although a directory may be physically stored off the premises of the computing service provider 104, the directory may nevertheless be referred to as an on-premises directory because it is on-premises with respect to the organization to which it belongs.

The computing service provider 104 may be a single computing device, or it may include multiple distinct computing devices, such as computer servers, logically or physically grouped together to collectively operate as a server system. The components of the computing service provider 104 can each be implemented as hardware, such as a server computing device, or as a combination of hardware and software. In addition, the components of the computing service provider 104 can be combined on one server computing device or separated individually or into groups on several server computing devices. In some embodiments, the features and services provided by the computing service provider 104 may be implemented as web services consumable via the communication network 110. In further embodiments, the features and services are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The organizations 106A-106C can correspond to various customers of the computing service provider 104. Although the term "organization" is used herein, the features involving such organizations may additionally or alternatively involve any customer having a directory (whether on-premises or off-premises) and wishing to use the computing service provider 104 to manage access to the directory by applications hosted by the computing service provider 104 or third-party application servers 108.

Organizations that maintain on-premises directories 160 may have one or more servers on which the directories 160 are stored. For example, organization 106A may have a data center that includes various servers, and an on-premises directory 160 may be stored on one or more of the servers. Organizations that maintain off-premises directories may employ the services of the computing service provider 104, which may store the off-premises directory in an off-premises directory data store 144. For example, organization 106B may not maintain an on-premises directory at all, but may rely instead on the computing service provider 104 to maintain the organization's directory 144. Some organizations may choose to maintain multiple directories on-premises and/or off-premises. For example, organization 106C may store multiple on-premises directories 160, each in a manner similar to organization 106A (described above), and the organization 106C may also choose to employ the computing service provider 104 to maintain an off-premises directory 144. The directory 144 maintained by the computing service provider 104 in this example may be a mirror or subset of the on-premises directory (e.g. for backup or disaster-recovery purposes), or it may be a separate directory altogether (e.g., a directory of computing resources in a different region from the on-premises directory 160).

The communication network 110 may be a publicly accessible network of linked networks, possibly operated by various distinct parties, such as the Internet. In some embodiments, the communication network 110 may be or include the Internet, a private network, personal area network, local area network, wide area network, cable network, satellite network, cellular telephone network, etc. or combination thereof.

Setting Up Application Access to Directories

Figure 2:
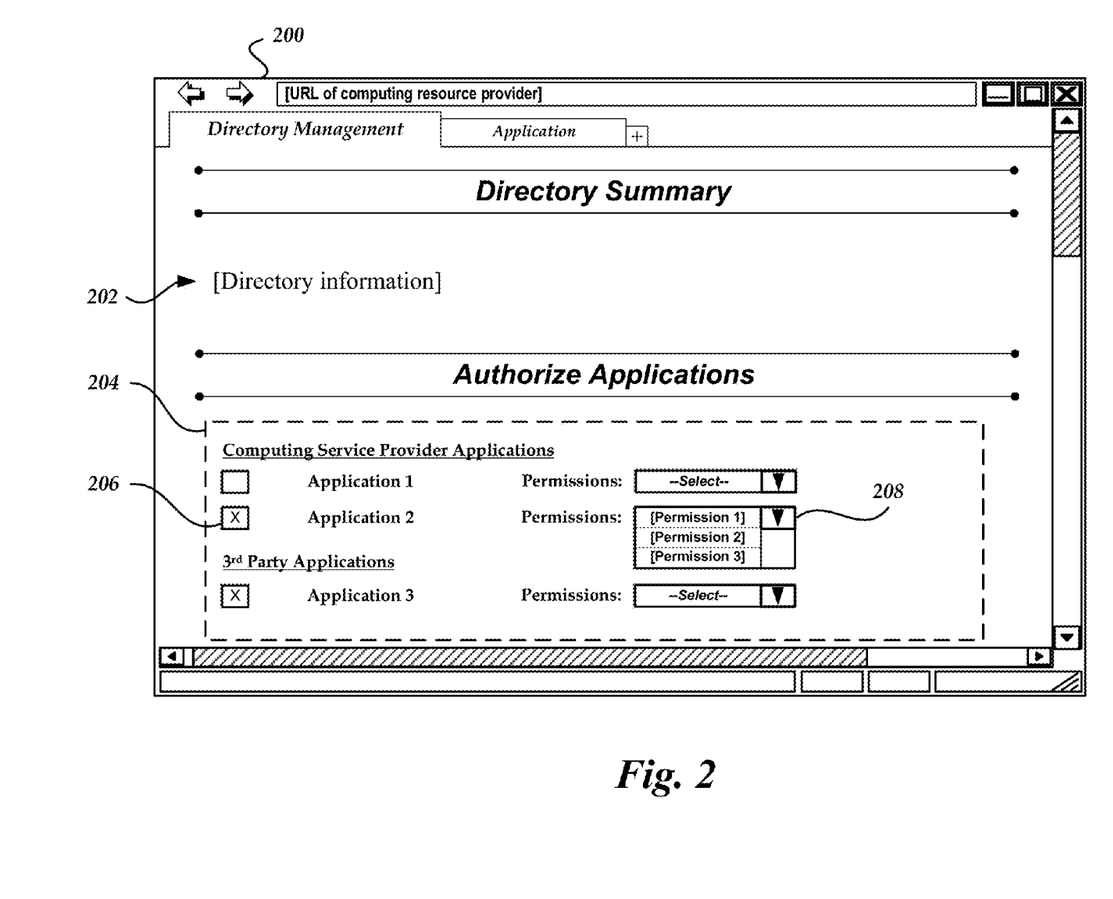
FIG. 2 is a diagram of a user interface for managing application access to directories according to some embodiments.

FIG. 2 shows an example user interface for managing application access to an organization's directory or directories. A system administrator or some other user associated with an organization, such as one of the organizations 106A-106C shown in FIG. 1, may access the computing service provider 104 to manage application access to the organization's directory. Illustratively, the computing service provider 104 may include a server (e.g., a web server) that generates and transmits network-based content pages for managing directories and applications. The content page 200 shown in FIG. 2 is an example of such a content page.

The interface may include separate panels, areas or portions for showing information about the organization's directory and for configuring application access to the directory. For example, directory information 202 may include the directory name, ID, size (e.g., number of users or other objects), type (e.g., on-premises or off-premises), date launched, address, description, status, applications and services enabled to use the directory, etc.

An application authorization portion 204 may include a listing of all applications and services with which the current directory may be used. As shown, the available applications may include applications hosted or otherwise managed by the computing service provider 104. In addition, applications hosted by third party servers 108 may access the organization's directory through the computing service provider 104 (e.g., via an API provided by the computing service provider 104), and may also be listed in the application authorization portion 204. A user may selectively authorize or de-authorize individual applications by, e.g., activating or de-activating a checkbox 206 or interacting with some other interface control configured to indicate selection or de-selection of an item.

For applications that the user has chosen to authorize, the user may determine which permissions may be given to the application. A drop-down list 208 or some other interface control configured to present multiple selectable options may be provided to allow the user to select permissions or otherwise authorize directory-related actions for individual applications. In some embodiments, the directory-related actions that the applications may be authorized to perform include: creating, modifying, and/or deleting users; creating, modifying, and/or deleting groups of users; managing passwords; listing users; authenticating users; joining computers to a domain; creating, modifying, and deleting files and file system objects; and the like. Permissions selected for some applications may be different than those selected for other applications. In some cases, a user may select multiple permissions for a single application, such as when the available options are not mutually exclusive (e.g., allowing a file storage and backup application to modify user information and also join new computers to the domain with which the directory is associated). In further embodiments, for ease of administration, roles maybe created (e.g., within the directory and/or at the computing service provider 104) to encompass multiple directory-related actions. Applications may then be assigned to one or more roles.

The options that are presented in the drop-down list 208 or otherwise selectable for a particular application may be limited based on the permissions granted to the directory management service 142 or the computing service provider 104 in general. When an organization employs the computing service provider 104 to manage the organization's directory (or portions thereof), the organization may not grant the computing service provider 104 complete authority to access and modify all aspects of the directory. For example, organization 106A may maintain an on-premises directory 160, and may create a user account or role within the directory 160 that the organization 106A can assign to the computing service provider 104. The user account or role may include permissions to perform only a subset of all directory-related actions that may be performed on or with the directory, such as full authority over some objects or object types, read-only access to other objects or object types, no access to still other objects or object types, etc. The user account (or a user account assigned to the role) may then be provided to the computing service provider 104 for use in accessing the directory 160. Thus, when the directory management service 142 of the computing service provider 104 accesses the on-premises directory 160 of the organization 106A on behalf of some application or service, the directory management service 142 may only perform the directory-related actions that have been authorized for the user account with which the directory management service 142 is accessing the directory 160.

The directory-related actions that may be performed by applications via the directory management service 142 may be limited based on the permissions granted to the directory management service 142 and also the permissions granted to the respective applications. As described above, the directory management service 142 or the computing service provider 104 in general may only be authorized to perform a subset of possible directory-related actions in a particular directory. When an organization administrator or other user sets up application access to the organization's directory, the permissions assigned to any particular application may not go beyond those granted to the directory management service 142. However, in some embodiments the user may "down-scope" the permissions by granting less than the full set of permissions granted to the directory management service 142. For example, the directory management service 142 may be granted permission to read and modify user accounts but not to create new user accounts. When a user is assigning permissions to an application that will access the directory via the directory management service 142, the user may not be permitted to grant the application permission to create new user accounts because the directory management service 142 itself cannot do so. However, the user may restrict application access to user accounts beyond the restrictions applied to the directory management service 142 by, e.g., granting read-only access to use information.

When an application is authorized access to a directory and assigned specific permissions, data regarding the application and its permissions with respect to the directory may be stored at the computing service provider 104 so that the computing service provider 104 can quickly implement or otherwise facilitate the authorized access. For example, metadata may be stored in the application access data store 146 indicating that a particular application, such as a file storage and backup application, has access to the file systems of computing devices within the organization's directory. Thereafter, when a user with login credentials in the organization's directory logs in to the computing service provider 104 and wishes to use an application, the computing service provider 104 can determine which applications may access the directory, which directory-related actions the applications have been authorized to perform, etc. In some embodiments, application authorization and permissions may be stored in the organization's directory in addition to, or instead of, the application access data store 146. For example, is the organization's directory is an off-premises directory managed by the computing service provider 104, the application authorization and permissions may be stored in the off-premises directory data store 144 with the rest of the organization's directory information.

Managing Application Access to Directories

Figure 3:
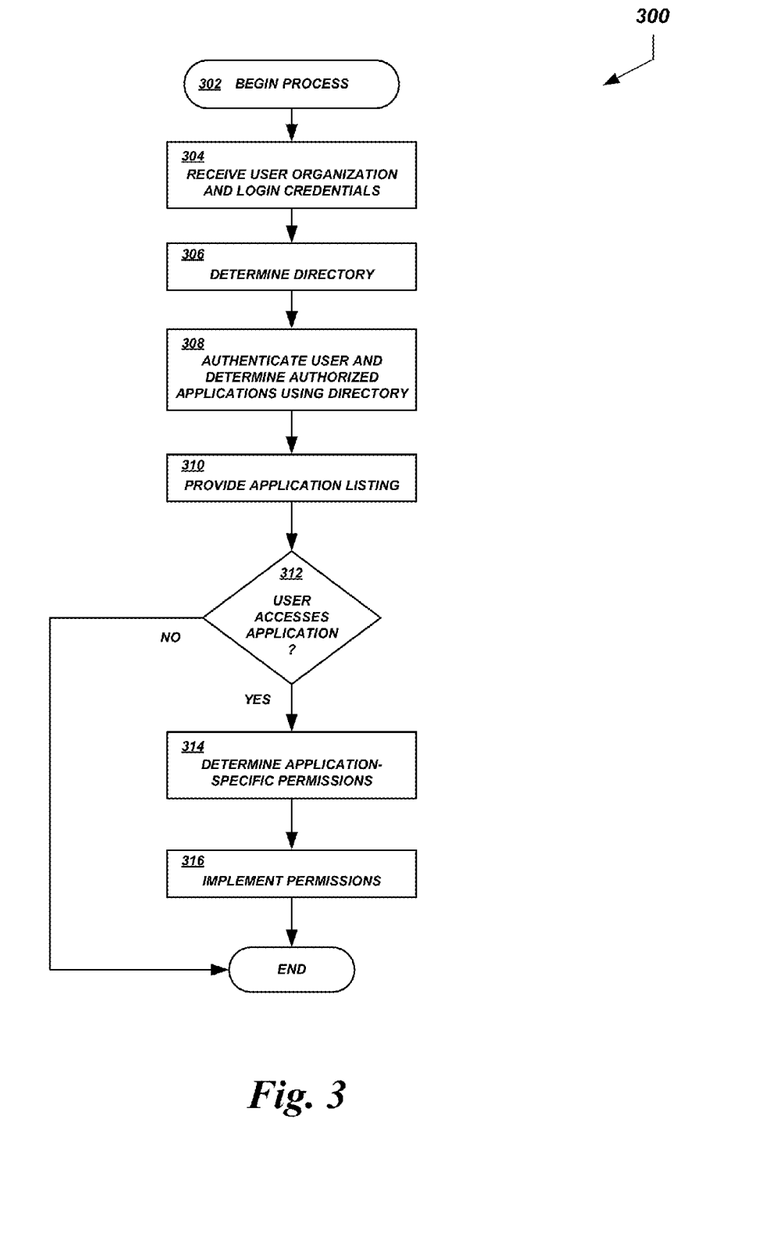
FIG. 3 is a flow diagram of an illustrative process for managing application access to directories.

FIG. 3 illustrates a sample process 300 that may be used by a directory management service 142 or some other module or component of a computing service provider 104 to manage application access to customer directories. Advantageously, the directory management service 142 may manage application access to directories of multiple, distinct organizations or other customers, rather than a single directory of the directory management service 142. Moreover, in some embodiments the directories of the multiple, distinct organizations may be either on-premises directories, off-premises directories, or some combination thereof. In this way, the directory management service 142 can provide consistent directory access services to various applications regardless of which organizations own the directories, the location of the directories, the format of the directories, etc.

The process 300 begins at block 302. For example, the process 300 may begin automatically upon user initiation of a connection with the computing service provider 104 by launching a browser application on a user computing device 102 and navigating to a login page, by launching a client application on the user computing device 102 that establishes a connection with the computing service provider 104, etc.

At block 304, the computing service provider 104 can receive user login credentials and information about the user's organization. The login credentials may be provided by the user via a graphical interface (e.g., text boxes provided for user name and password on a web page displayed by a browser application), or they may be automatically provided during or subsequent to establishment of a connection between the user computing device 102 and the computing service provider 104. In some embodiments, the user's organization may be provided by the user via the graphical interface (e.g., using a drop-down list), with the user's login credentials (e.g., pre-pended onto the user's username), or it may be known by the computing service provider 104 if the user has accessed an organization-specific login page (e.g., using a network address that includes an identifier of the organization).

At block 306, the directory management service 142 or some other module or component of the computing service provider 104 can determine the particular directory to use in authenticating the user, authorizing particular actions, and otherwise proceeding with the user's session at the computing service provider 104. The directory may be determined based on information provided with the user credentials. For example, the "user name" portion of the user's credentials may include an identifier associated with a particular customer, a particular domain of a customer, a particular directory, etc. In some embodiments, the directory may be determined based on the manner which the user established the session with the computing service provider 104. For example, the user may have accessed a login page using a uniform resource locator ("URL") or other network address that is uniquely associated with a particular customer, a particular domain of a customer, a particular directory, etc.

At block 308, the directory management service 142 or some other module or component of the computing service provider 104 can authenticate the user and determine which applications the user is authorized to access. Any number of applications, whether hosted by application servers 140 of the computing service provider 104 or by third party application servers 108, may be configured to work with the directory management servicer 142. However, not all applications may be permitted to access the current directory (determined above), and the current user may not be permitted to access applications (even if particular applications are permitted to access the current directory). The directory management service 142 may authenticate the user using the current directory and the user-supplied (or automatically obtained) user credentials. The directory management service 142 may then determine which applications the user is permitted to access, and present a listing of available applications at block 310. In some embodiments, a user may select an application first and then log in to that application.

At decision block 312, the directory management service 142 or some other module or component of the computing service provider 104 can determine whether the user has accessed a particular application. If so, the process 300 can proceed to block 314; otherwise, the process 300 can terminate.

At block 314, the directory management service 142 or some other module or component of the computing service provider 104 can determine the application-specific permissions for the selected or otherwise accessed application. As described above, the application-specific permissions may be stored in the application access metadata store 146. Thus, the directory management service 142 can determine the application-specific permissions for the current application by querying or otherwise accessing data in the application access metadata store 146. In some embodiments, application-specific permissions may be stored in some other location, such as in the current directory (e.g., an off-premises directory of the current customer), and the permissions can be obtained from that location.

Figure 4:
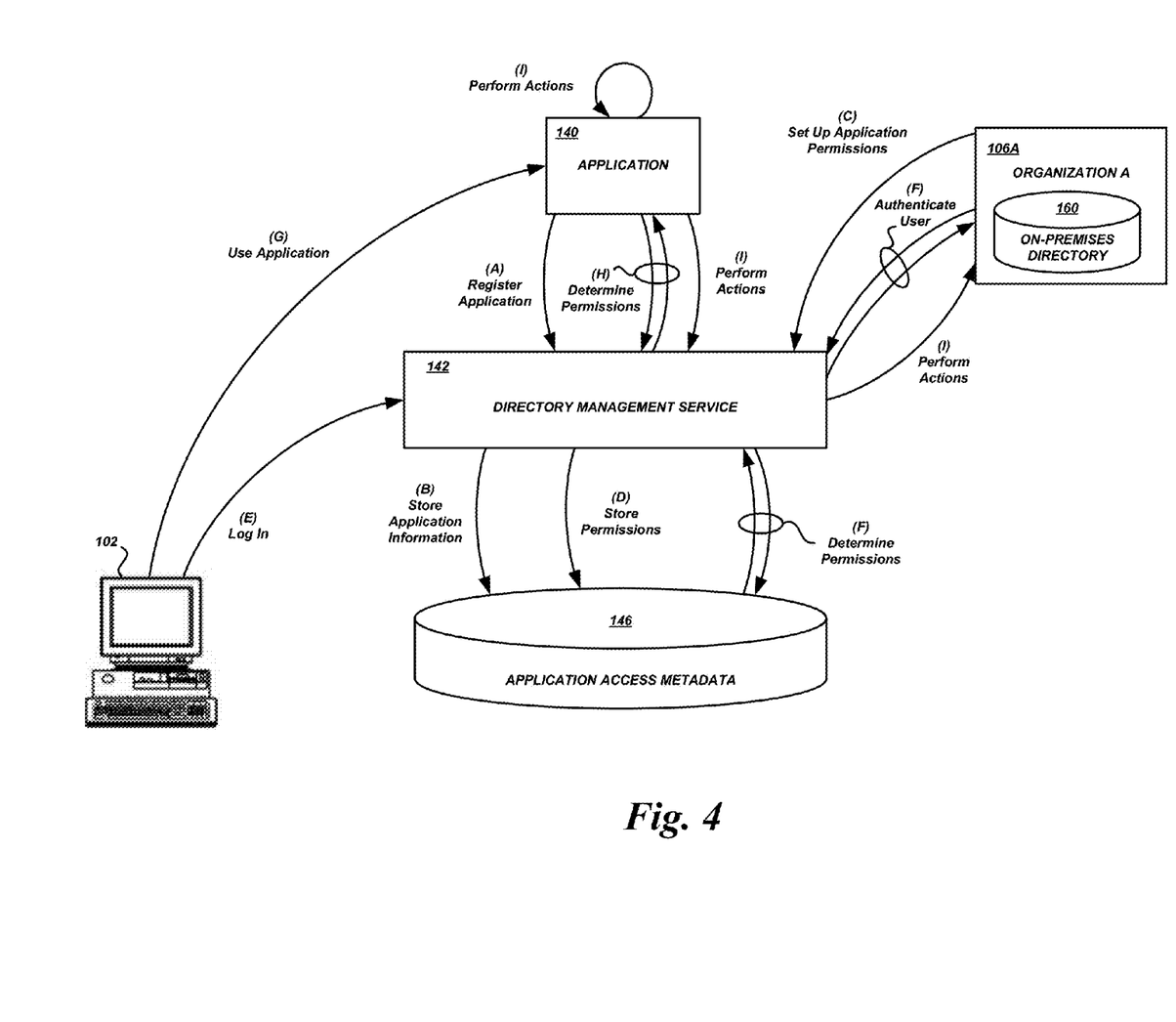
FIG. 4 is a diagram of illustrative interactions and data flows between a network-based directory service and a user, application, and organization.
Figure 5:
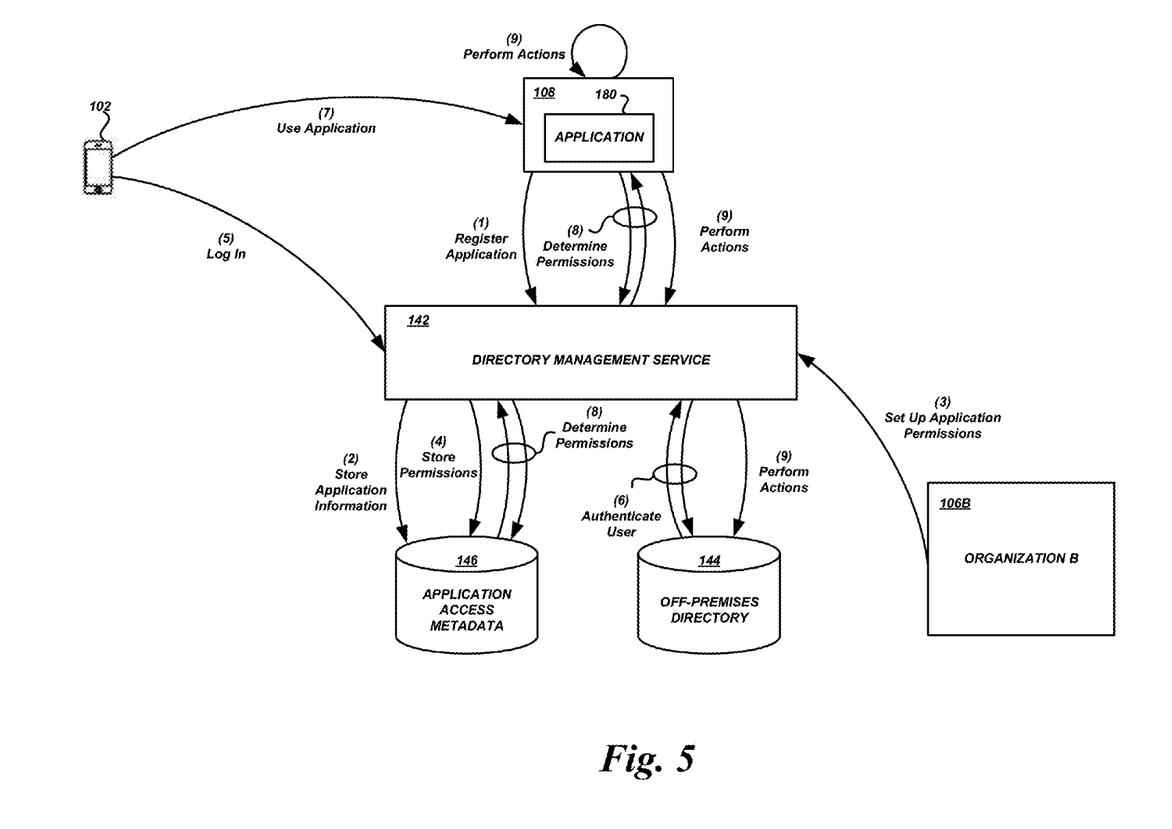
FIG. 5 is a diagram of additional illustrative interactions and data flows between a network-based directory service and a user, application, and organization.

At block 316, the directory management service 142 or some other module or component of the computing service provider 104 can implement the application-specific permissions. Implementation of application-specific permissions may include enabling or permitting the application to perform certain actions using the current directory, prohibiting the application from performing certain actions using the current directory, etc. FIGS. 4 and 5 show example interactions and data flows between the directory management service 142 and various user computing devices, applications and organizations to illustrate the implementation of application-specific permissions.

FIG. 4 shows interactions between a user computing device 102, an application 140, an organization 106A, and the directory management service 142 during the process of setting up application access to the directory 160 and the subsequent management of directory access by the directory management service 142.

At (A), the application 140 may be registered with the directory management service 142, which can store information about the application 140 in the application access metadata 146 at (B). Registration of an application 140 allows the directory management service 142 to set up permissions to the directories of various organizations (e.g., provide the application 140 as an option in the interface shown in FIG. 2). The application information that is stored may include, e.g., the application name, logo, description, technical information, and the like. In some embodiments, the application developer or host may register the application 140 with the directory management service 142. In other embodiments, the directory management service 142 (or an administrator, technician, or other person associated therewith) may register the application 140.

At (C), the organization 106A may set up application permissions to the organization's on-premises directory 160. In some embodiments, an administrator, technician, or other person associated with the organization may use the interface 200 described above with respect to FIG. 2. For example, the application 140 may be file storage and back up application hosted by the computing service provider 104. The application 140 may require substantial permissions in order to provide the full scope of its functionality to the organization 106A, including permission to access and modify the file system of the organization's computers, permission to join computing devices (e.g., storage servers) to the organization's domain, etc. These and other permissions may be granted to the application 140 individually, or through the assignment of a particular role or other policy to the application. At (D), the directory management service 142 can store metadata about the permissions granted to the application 140 in the application access data store 146.

At (E), a user may use a user computing device 102 to log in to the computing service provider 104. Illustratively, the user may be an employee of the organization 106A, and may use credentials supplied by the organization. At (F), the directory service provider 142 can use the directory 160 to authenticate the user and determine which applications the user may access or otherwise determine what the user is authorized to do. In the present example, the user may be authorized to access the file storage and backup application 140, and at (G) the user may launch the application in order to access some previously stored file, change a backup protocol, or the like.

At (H), the directory management service 142 can determine which permissions the application 140 has with respect to the organization's directory 160. As described above, the application 140 may have substantial permissions in order to facilitate implementation of the full scope of the functionality provided by the application 140. Thus, the application 140 may perform actions at (I) that involve substantial directory permissions because the application 140 has been granted such permissions, and information pertaining to the granted permissions has be stored in, and retrieved from, the application access data store 146. In some embodiments, the application 140 may not necessarily permit users to request performance of all actions that the application 140 has been authorized to perform. Instead, the application 140 may down-scope the permissions for the current user, instead allowing the user to initiate only a subset of actions. For example, if the current user is not a file storage and backup specialist or is otherwise not part of the information technology (IT) department of the organization 106A, the user may not be permitted to initiate actions that the application 140 is otherwise authorized to perform. Such down-scoping of permissions may be based on permissions granted to the user in the directory 160. For example, any given user may only initiate actions using any given application that both the user and the application are authorized by the organization to perform.

FIG. 5 shows interactions between a user computing device 102, an organization 106B, an application 180 hosted by a third-party server 108, and the directory management service 142. The illustrated interactions may occur during the process of setting up application access to an off-premises directory of the organization 160B and during the subsequent management of directory access by the directory management service 142.

At (1), the application 180 may be registered with the directory management service 142, which can store information about the application 180 at (2), as described above with respect to FIG. 4. At (3), the organization 106B may set up application permissions to the organization's off-premises directory 160. In some embodiments, an administrator, technician, or other person associated with the organization may use the interface 200 described above with respect to FIG. 2. For example, the application 180 may be a messaging application hosted by a third-party server 108. The application 108 may only require a moderate level of permissions in order to provide the full scope of its functionality to the organization 106B, such as read-only access to users' contact information. As described above, permissions may be granted to the application 108 individually, or through the assignment of a particular role or other policy to the application. At (4), the directory management service 142 can store metadata about the permissions granted to the application in the application access data store 146.

At (5), a user may use a user computing device 102 to log in to the computing service provider 104. Illustratively, the user may be an employee of the organization 106B, and may use credentials supplied by the organization. At (6), the directory service provider 142 can use the off-premises directory of the organization 106B, stored in the off-premises data store 144 or in some other location, to authenticate the user and determine which applications the user may access or otherwise determine what the user is authorized to do. In the present example, the user may be authorized to access the messaging application 180, and at (7) the user may launch the application 180.

At (8), the directory management service 142 can determine which permissions the application 180 has with respect to the organization's off-premises directory. As described above, the application 108 may have moderate permissions, such as read-only access to user contact information. Thus, the application 180 may perform actions at (9) that involve the moderate directory permissions.

Each of the examples illustrated in FIGS. 4 and 5 may be facilitated by a single directory management service or system. The examples shown and described herein are illustrative only, and are not intended to be limiting. As will be appreciated, additional examples may also be facilitated by the same directory management system, such as management of access to multiple directories of a single organization, management of access to directories by various other types of applications, etc. Because the directory management service can manage access, by integrated or third-party applications, to directories of multiple organizations, whether on-premises or off-premises, the directory management service can provide a flexible solution to a wide range of organizations.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the process 300 described with respect to FIG. 3 may be embodied in a set of executable program instructions stored on one or more non-transitory computer-readable media, such as one or more disk drives or solid-state memory devices, of a computing system with which the computing service provider 104 is associated. When the process 300 is initiated, the executable program instructions can be loaded into memory, such as RAM, and executed by one or more processors of the computing system. In some embodiments, the computing system may include multiple computing devices, such as servers, and the process or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A directory management system comprising one or more physical computing devices, the directory management system configured to at least:
  receive directory access configuration information from each of a plurality of organizations for each of a plurality of respective network directories that are separate from the directory management system, wherein the directory access configuration information received from individual organizations of the plurality of organizations reflects authorization of at least one application to have performed, by the directory management system, at least one action using a network directory of the organization, wherein at least some of the network directories are on-premises network directories hosted locally by the respective organizations on on-premises computing systems that are remote from the directory management system, and wherein the directory access configuration information specifies network locations of the on-premises network directories;
  establish communications with a first application of a plurality of available applications, the first application executing on one or more physical computing devices separate from a first organization of the plurality of organizations;
  determine, based at least partly on access configuration information received from the first organization, at least one action that the first application is authorized to have performed by the directory management system using a first network directory of the first organization, the first network directory hosted locally by the first organization, remotely from the directory management system; and
  in response to a request from the first application to perform an authorized action on the first network directory, perform the authorized action over a network on behalf of the first application using a user account assigned to the directory management system by the first organization, said user account including permissions that specify actions that the directory management system is authorized to perform on the first network directory on behalf of applications.

2. The directory management system of claim 1, wherein the network directory of the first organization comprises a collection of data regarding a plurality of resources of a computing network of the first organization, and wherein at least a portion of the data is organized into objects representing individual resources of the plurality of resources.

3. The directory management system of claim 1, further configured to block, based at least partly on the access configuration information received from the first organization, performance of a second action requested by the first application to be performed on the first network directory.

4. A computer-implemented method comprising:
  as implemented by a directory management system comprising one or more computing devices,
    receiving directory access configuration information for a first directory of a first organization, the first directory hosted locally on a premises of the first organization remotely from the directory management system, said directory access configuration information specifying a network location of the first directory and including application access policy information for accessing the first directory;
    receiving directory access configuration information for a second directory of a second organization, the second directory hosted locally on a premises of the second organization remotely from the directory management system, said directory access configuration information for the second directory specifying a network location of the second directory and including application access policy information for accessing the second directory;

determining, for an application, based on the received access configuration information for the first directory, a first policy regarding accessing the first directory of the first organization, wherein the application and the directory management system are each separate from the first organization;

responding to a first request by the application to perform a first action on the first directory by determining whether the first action is authorized, and when the first action is authorized, by performing the first action on the first directory on behalf of the application using a first user account assigned to the directory management system, said first user account including first permissions that specify actions that the directory management system is authorized to perform on the first directory on behalf of applications, wherein the directory management system determines whether the first action is authorized based on the first permissions and based additionally on said first policy;

determining, for the application, based on the received access configuration information for the second directory, a second policy regarding accessing the second directory of the second organization, wherein the application and the directory management system are each separate from the second organization, and wherein the second policy is different than the first policy; and responding to a second request by the application to perform a second action on the second directory by determining whether the second action is authorized, and when the second action is authorized, by performing the second action on the second directory on behalf of the application using a second user account assigned to the directory management system, said second user account including second permissions that specify actions that the directory management system is authorized to perform on the second directory on behalf of applications, wherein the directory management system determines whether the second action is authorized based on the second permissions and based additionally on said second policy.

5. The computer-implemented method of claim 4, wherein the first directory of the first organization comprises a collection of data regarding a plurality of resources of a computing network of the first organization.

6. The computer-implemented method of claim 4, wherein the first action comprises one of: listing users; authenticating a user; creating a user; modifying a user; deleting a user; changing a password; creating a group; modifying a group; deleting a group; joining a computing device to a domain; reading a file; writing a file; creating a file; deleting a file; or modifying a storage structure.

7. The computer-implemented method of claim 4, further comprising determining the first policy based at least partly on application access configuration information received from the first organization.

8. The computer-implemented method of claim 4, wherein the directory management system receives the first and second requests from the application via an application programming interface that the application uses to initiate individual actions.

9. Non-transitory computer-readable storage having stored thereon executable instructions configured to cause one or more physical computing devices of a directory management system to execute a process comprising:

receiving directory access configuration information for a directory of an organization, the directory hosted locally on a premises of the organization remotely from the directory management system, said directory access configuration information specifying a network location of the directory and including application access policy information for accessing the directory;

determining, for a first application, based on the received access configuration information for the directory, a first policy regarding accessing the directory of the organization, wherein the first application and the directory management system are each separate from the organization;

responding to a request from the first application to perform a first action on the directory by determining, based on the first policy, whether the first action is authorized, and when the first action is authorized, by performing the first action on the directory on behalf of the first application;

determining, for a second application, based on the received access configuration information for the directory, a second policy regarding accessing the directory of the organization, wherein the second application is separate from the organization, and wherein the second policy is different than the first policy; and responding to a request from the second application to perform a second action on the directory by determining based on the second policy, whether the second action is authorized, and when the second action is authorized, by performing the second action on the directory on behalf of the second application.

10. The non-transitory computer-readable storage of claim 9, wherein the directory of the organization comprises a collection of data regarding a plurality of resources of a computing network of the organization.

11. The non-transitory computer-readable storage of claim 9, wherein the directory management system receives said requests from the first and second applications via an application programming interface of the directory management system.

12. The non-transitory computer-readable storage of claim 9, the process further comprising prohibiting the first application from having performed an action using the directory, wherein the second application is permitted to have performed the action using the directory.

13. The non-transitory computer-readable storage of claim 9, wherein the organization maintains a plurality of different directories, and wherein the first application is permitted to access only a subset of the plurality of different directories through the directory management system.

14. The non-transitory computer-readable storage of claim 9, wherein the first action is performed by the directory management system using a user account assigned to the directory management system, said user account including permissions that specify actions that the directory management system is authorized to perform on the directory on behalf of applications, wherein the directory management system determines whether the first action is authorized based on the permissions and based additionally on the first policy.

15. The non-transitory computer-readable storage of claim 14, wherein the second action is performed by the directory management system using the user account, wherein the directory management system determines whether the second action is authorized based on the permissions and based additionally on the second policy.

16. The directory management system of claim 1, wherein the actions that can be performed on the first network directory by the directory management system on behalf of the first application are limited based on (1) application-specific permissions specified in the directory access configuration information provided for the first network directory, and (2) the permissions included in said user account.

17. The directory management system of claim 16, wherein the directory management system is additionally configured to determine the actions that can be performed on the first network directory on behalf of the first application based on access rights of a user that invokes the first application.

* * * * *

UNITED STATES PATENT AND TRADEMARK OFFICE
CERTIFICATE OF CORRECTION

PATENT NO. : 9,998,499 B2
APPLICATION NO. : 14/499714
DATED : June 12, 2018
INVENTOR(S) : Gaurang Pankaj Mehta et al.

Page 1 of 1

It is certified that error appears in the above-identified patent and that said Letters Patent is hereby corrected as shown below:

In the Claims

In Column 16, Lines 34-35, change "determining" to --determining,--

Signed and Sealed this
Thirtieth Day of October, 2018

Andrei Iancu
*Director of the United States Patent and Trademark Office*